ns Patent Office 3,738,923
Patented June 12, 1973

3,738,923
POLY(ETHYLENE/CHLOROTRIFLUOROETHYL-
ENE) AND POLY(ETHYLENE/TETRAFLUORO-
ETHYLENE) HAVING IMPROVED HIGH TEM-
PERATURE PROPERTIES
Dana Peter Carlson, Wilmington, Del., and Norman
Eugene West, Vienna, W. Va., assignors to E. I. du
Pont de Nemours and Company, Wilmington, Del.
No Drawing. Continuation-in-part of application Ser. No.
4,395, Jan. 20, 1970, which is a continuation-in-part
of application Ser. No. 777,172, Nov. 19, 1968. This
application Mar. 1, 1971, Ser. No. 119,814
Int. Cl. B01j 1/10; C08f 27/00
U.S. Cl. 204—159.2   13 Claims

ABSTRACT OF THE DISCLOSURE

The subjecting of poly(ethylene/tetrafluoroethylene) and poly(ethylene/chlorotrifluoroethylene) to a moderate amount of ionizing radiation has the effect of improving the tensile properties, especially ultimate elongation, of the copolymers at elevated temperatures. The amount of radiation required to obtain this improvement is minimized by following the radiation treatment with heat treatment of the copolymer.

This application is a continuation-in-part of application Ser. No. 4,395, filed Jan. 20, 1970, which is in turn a continuation-in-part of application Ser. No. 777,172, filed Nov. 19, 1968, both now abandoned, by the same inventors.

This invention relates to poly(ethylene/tetrafluoroethylene) and poly(ethylene/chlorotrifluoroethylene) and more particularly to such copolymer having improved solder-iron resistance and mechanical properties at high temperature.

Polytetrafluoroethylene has achieved notable success as a high temperature resistant wire coating. Apart from the high melting point of the polymer, one reason for this success is the high solder-iron resistance of the polymer. When a solder iron is used to connect terminals of the wire and the iron contacts the polymer coating, the coating does not flow away from the solder iron to leave the wire exposed. The use of polytetrafluoroethylene in this application, however, has the drawback of the polymer not being melt fabricable, which means the polymer has to be sintered after application to the wire. A high temperature-resistant dielectric copolymer which has adequate solder-iron resistance and which is also melt fabricable has not been found. For example, commercially available tetrafluoroethylene/hexafluoropropylene copolymer, while it possesses all the other qualities desired for a high temperature-resistant wire coating, it melts and flows away from a solder iron to leave the wire exposed.

The copolymer of ethylene with tetrafluoroethylene has been known for sometime (U.S. Patent 2,468,664 to Hanford and Roland), but has not received any continued use in commerce because of certain of its disadvantageous attributes. While the copolymer is known to have a melting point as high as 300° C., it could not be used at high temperatures even far below this melting point in applications requiring strength, because of the deterioration of the mechanical properties of the copolymer. For example, when used as a wire coating, the copolymer becomes brittle at 200° C., and cracks under low stress to leave the wire exposed. In a more quantitative sense, a copolymer (1:1 mole ratio of monomers) which may have an ultimate elongation of over 300 percent at room temperature may have an ultimate elongation of less than 18 percent at 200° C.

Copolymers of ethylene/chlorotrifluoroethylene are disclosed in U.S. Patent 2,392,378 to Hanford, but such copolymers melt at temperatures below 200° C. A procedure for preparing higher melting copolymers of these monomers is disclosed in European Polymer Journal, vol. 3, pages 129–144 (1967), but even these higher melting copolymers cannot be used at high temperature application since they suffer from the same disadvantage as the ethylene/tetrafluoroethylene copolymers. For example, a 1:1 mole ratio copolymer of ethylene/chlorotrifluoroethylene melting at 235° C. has an ultimate elongation of greater than 150 percent at room temperature but has an ultimate elongation of less than 32 percent at 200° C., making such copolymers useless as a wire coating intended for service at 200° C.

The present invention provides poly(ethylene/tetrafluoroethylene) and poly(ethylene/chlorotrifluoroethylene) which have both good mechanical, especially tensile, properties at high temperatures and high solder-iron resistance, the latter being comparable to that of polytetrafluoroethylene, so as to make the copolymer especially suited for wire-coating applications at high temperatures. In terms of process, the present invention involves subjecting either copolymer to an effective amount of ionizing radiation conveniently at moderate temperatures. Another aspect of the process of this invention is to follow the ionizing radiation with heat-treatment of either copolymer, which improves the result obtained by the radiation or enables similiar improvement to be obtained at a lower radiation dosage.

With respect to the ethylene and tetrafluoroethylene or chlorotrifluoroethylene content of each class of copolymer, from 40 to 60 mole percent of ethylene is present and, complementary to total 100 mole percent of ethylene plus either tetrafluoroethylene or chlorotrifluoroethylene, from 40 to 60 mole percent of tetrafluoroethylene or chlorotrifluoroethylene is present. When either more or less tetrafluoroethylene or chlorotrifluoroethylene is present, the tensile properties and cut-through resistance of the copolymer become undesirably low. Description of the composition of the copolymers herein in terms of monomer content is intended to refer to the units making up the copolymer derived by copolymerization of the monomers.

The effect of the radiation on the poly(ethylene/tetrafluoroethylene) and poly(ethylene/chlorotrifluoroethylene) is twofold, namely, to improve the tensile properties of the copolymer at high temperatures such as 200° C. and to increase the solder-iron resistance of the copolymer. A small amount, e.g. up to 10 mole percent but usually 0.1 to 10 mole percent based on ethylene plus tetrafluoroethylene or chlorotrifluoroethylene, of other copolymerizable monomer which is free of telogenic activity can be present in the copolymers irradiated according to the present invention, such monomer being of the type or in the amount present that does not significantly improve the high temperature tensile properties of the copolymer. The lack of significant improvement in such properties manifests itself by the resultant terpolymer having an ultimate elongation of less than 150% at 200° C.

By "copolymerizable" is meant that the monomer must be able to form an integral part of the main copolymer chain and must not act as an inhibitor to prevent the copolymerization reaction from occurring. By "free of telogenic activity" is meant that the monomer does not act as a chain transfer agent to an extent which undesirably limits the molecular weight of the copolymer. Examples of third monomers for terpolymers in which the twofold improvement is obtained are the vinyl monomers having no more than one carbon atom in a side chain, such as hexafluoropropylene, isobutylene, and perfluoro (methyl vinyl ether). These monomers are to be distinguished from other copolymerizable monomers which in the proper amount improve the high temperature mechanical properties of the copolymer without irradiating. The latter monmers including the polyfluoroketones and the vinyl monomers having a substituent containing at least two carbon atoms so as to provide a side chain of corresponding bulk in the terpolymer. Further description of the effect of irradiating the terpolymers containing these monomers is given in patent application Ser. No. 119,815 filed on the same date as the present application by the same inventors.

The tetrafluoroethylene-containing copolymers hereinbefore described can be prepared by the non-aqueous polymerization Ser. No. 679,162, filed Oct. 30, 1967 by Carlson (now U.S. Patent No. 3,528,954) which comprises bringing the two or more monomers being copolymerized together in a hydrochlorofluorocarbon solvent, commonly available as a "Freon" at a temperature from 30 to 85° C. and in the presence of a polymerization initiator active at such temperature and thereafter recovering the copolymer.

The chlorotrifluoroethylene-containing polymers hereinbefore described are preferably prepared in a nonaqueous polymerization system by a process described in the aforementioned article in the European Polymer Journal. Instead of the initiators disclosed therein, one can use a low temperature initiator such as trichloroacetyl peroxide. For the copolymer to have a melting point above 200° C., the polymerizatiin temperature should be less than 20° C., and preferably less than 10° C. A good balance of properties (except for high temperature mechanical properties) is obtained at polymerization temperatures from −10 to +10° C.

Generally, both the tetrafluoroethylene-containing copolymers and the chlorotrifluoroethylene-containing copolymers are composed essentially of ethylene units alternating with either tetrafluoroethylene or chlorotrifluoroethylene units on a 1:1 basis.

The ionizing radiation used in the present invention is of sufficiently high energy to penetrate the thickness of the copolymer being treated and produce ionization therein. The ionizing radiation can consist of X-rays, gamma rays, or a beam of electrons, protons, deuterons, alpha-particles, beta-particles or the like, or combinations thereof. This radiation and suitable sources for its generation are disclosed in U.S. Patent 3,116,226 to Bowers. Generally, the energy level of the radiation is at least 500,000 electron volts, and preferably from 1 to 2 mev; although any energy level can be used which penetrates the thickness of the polymer being irradiated under the atmospheric conditions employed.

For the tetrafluoroethylene-containing copolymers, the amount of radiation to which the copolymer is subjected to be effective to obtain improved high temperature tensile properties or solder-iron resistance is generally from 2 to 80 megarads. Below the lower amount the improvement is not appreciable and above the upper amount, copolymer properties become adversely affected to an undesirable extent. Preferably, the copolymer is subjected to from 10 to 30 megarads. For the chlorotrifluoroethylene-containing copolymers, the general range of radiation is from 12 to 50 megarads and preferably from 25 to 50 megarads.

The temperature of the copolymer being irradiated is not important, but is generally less than 60° C., with ambient temperature, 20–25° C. being most convenient. Usually, the irradiation is conducted with the copolymer contained in an inert atmosphere; however, the irradiation can be conducted in air with some sacrifice in efficiency in the effect of the radiation on the copolymer.

The copolymer can be irradiated by conventional methods, i.e. the copolymer is irradiated after fabrication into its final form, such as film, fiber, tube, or coating such as on a wire. The irradiation can be carried out by passing the fabricated copolymer at a constant rate through the field of radiation. For example, the copolymer can be extruded onto a wire, cooled, and the resultant coated wire subjected to irradiation. This wire is useful at temperatures as high as 240–250° C. (for coatings in which the copolymer has a higher melting temperature than 250° C.) for short periods of time and is useful for continuous service at 180° C. Twenty gauge (19 strand) wire coated with 8 to 12 mils of the copolymer and irradiated according to the present invention does not crack under the stress caused by wrapping the wire 180° around a ¾ inch mandrel and having 2-lb. weights attached to each downwardly-extending end of the wire, this mandrel bend test being conducted for 120 hours at 200° C. and even as high as 240–250° C. In contrast, a similarly coated, but not irradiated, wire exhibits numerous cracks and separations of the coating from the wire when subjected to the same mandrel bend test at temperatures as low as 150° C.

Irradiation has been used heretofore to improve mechanical properties of such polymers as polyethylene and polyvinylidene fluoride above the melting point of the polymer so as to increase the use temperature of the polymer. In contrast, the melting points of poly(ethylene/tetrafluoroethylene) and of poly(ethylene/chlorotrifluoroethylene), in the compositional ranges given hereinbefore, are sufficiently high before irradiation, and radiation is given the unusual job of improving mechanical properties well below their respective melting point. The 1:1 poly(ethylene/tetrafluoroethylene) has a melting point of about 275° C. and the 1:1 poly(ethylene/chlorotrifluoroethylene) can be made to have a melting point up to about 265° C. However, compositions of these copolymers in which melting points are as low as 220° C. have useful mechanical properties at 200° C. when irradiated according to the present invention.

Normally, radiation has the effect of decreasing the high temperature elongation of the polymer being irradiated (U.S. Patent 3,142,629 to Timmerman). Unexpectedly, the elongations of poly(ethylene/tetrafluoroethylene) and poly(ethylene/chlorotrifluoroethylene) at 200° C. are greatly increased (the same is true for the terpolymers wherein the vinyl monomer has a side chain of no more than one carbon atom). Irradiation of polytetrafluoroethylene and polychlorotrifluoroethylene is known to degrade the polymer and sharply reduce its melting point (British Patent 768,554 and Nature, 172, 76–77 (1953), respectively). An exception to this effect on fluorocarbon polymers is disclosed in U.S. Patent 3,116,226 to Bowers, wherein degradation is reported to be avoided by irradiation of fluorocarbon copolymers at temperatures above the glass transition temperature of the copolymer, e.g., at least 150° C. Unexpectedly, beneficial results are obtained by radiation well below the glass transition temperature of the copolymers being treated. Even though these copolymers contain as much as about 85 percent by weight of tetrafluoroethylene or chlorotrifluoroethylene, little effect of the radiation on melting point is obtained. In addition, the improvement obtained by radiation in the present invention is temperature stable, i.e., the improvements in tensile properties and solder-iron resistance are retained even after prolonged exposure of the copolymer to high temperatures.

With respect to the heat treatment aspect of the present invention, the copolymer can be heated after being subjected to radiation to either improve the improvement obtained by irradiation, i.e. in mechanical properties and/or solder iron resistance, or lower the amount or dosage of radiation required to obtain a certain level of improvement. The heat treatment is generally practiced by heating the copolymer for 30 seconds to 20 minutes or more depending on the improvement desired, at a temperature of at least 150° C. Somewhat lower heat treatment temperatures can be used but the time required to obtain a significant effect is undesirably prolonged. The copolymer is not heated to so high a temperature that the copolymer will flow for the particular amount of time of heating being used. Generally, the copolymer will not be heated above 250° C. The heat treatment is conducted in the substantial absence of oxygen such as present in the atmosphere. This is accomplished by conducting the heating in an inert atmosphere or by having the heat time in air short enough that oxygen penetration into the copolymer is negligible. If heat treatment is omitted, it may occur in later high-temperature service of the copolymer in the presence of oxygen for an extended period of time, which tends to diminish the improvement obtained by the radiation. The preferred radiation dosage when heat treatment is used is from 5 to 15 megarads. The radiation dosage required for the degree of improvement desired can also be reduced by incorporating a small amount of a crosslinking promoter such as triallylcyanurate into the copolymer prior to radiation.

The following examples are illustrative of the present invention and are not intended as a limitation on the scope thereof. Parts and percents are by weight unless otherwise indicated.

EXAMPLE 1

A tetrafluoroethylene/ethylene copolymer which contained 48.9 mole percent tetrafluoroethylene and had a melt viscosity at 300° C. of $5.55 \times 10^4$ poises was pressed into 4-inch x 4-inch films of 10 mils and 40 mils thickness by compression molding at 310° C. and quenching in ice water. One film of each thickness was placed on the water cooled table below the window of the electron beam unit. The films were enclosed in a small box covered by thin aluminum foil and kept under a purge of argon gas.

The electron source was a General Electric 2000-kvp resonant transformer operating at 1 ma. beam current. The dose rate from this source at 30 cm. distance was 0.155 megarad per second for the 10 mil films and 0.172 megarad per second for the 40 mil films.

The films were given exposures of 5, 25, 50, 250 and 500 seconds under the beam at room temperature. The 40-mil films were cut up into small pieces and their melt viscosity determined at 300° C. The 10-mil films were cut into strips ½ inch x 3 inches and the MIT flex life determined using 1.5 kg. load and flexing at the rate of about 10,000 flexes per hour. The results are shown below:

| Exposure (seconds) | Melt viscosity (300° C.) $\times 10^{-4}$ poises | MIT flex life, cycles |
|---|---|---|
| None | 5.0 | 12,500 |
| 5 | 5.7 | 7,830 |
| 25 | 76.2 | 10,200 |
| 50 | (1) | 6,990 |
| 250 | (1) | 679 |
| 500 | (1) | 120 |

[1] No flow (10 min.).

The polymers were cross-linked as indicated by the melt viscosity data. The flex life decreased after extensive exposure, but the polymer had usable properties even after 500 seconds exposure (about 80 megarads).

EXAMPLE 2

The same copolymer as described in Example 1 was pressed into 4-inch x 4-inch films of 7-8 mils thickness by compression molding at 310° C. and cooling under pressure to 200° C. before quenching in ice water. The films were irradiated under the conditions described in Example 1 for exposures of 50, 100, 250, 500 and 1000 seconds. These exposures corresponded to radiation doses of 7.8, 15.5, 39.0, 78 and 155 megarads, respectively. The tensile properties of the films were determined at 200° C. and are shown below:

| Exposure (megarads) | Tensile strength (p.s.i.) | Ultimate elongation, percent |
|---|---|---|
| 0 | 654 | 16 |
| 7.8 | 664 | 76 |
| 15.5 | 677 | 340 |
| 39 | 1,250 | 286 |
| 78 | 1,040 | 926 |
| 155 | 960 | 49 |

The tensile properties were considerably improved by the irradiation, as indicated by the above data. There appeared to be an optimum dose of radiation (between 15 and 39 megarads) to achieve the maximum improvement in properties of the copolymer. However, even samples which received much higher doses of radiation (e.g., 155 megarads) had better tensile properties at 200° C. than the unirradiated material.

EXAMPLE 3

A tetrafluoroethylene/ethylene copolymer which contained 50.6 moles percent TFE and had a melt viscosity of $0.89 \times 10^4$ poises at 300° C. was extruded onto a 7-strand, AWG 22 silver-coated copper wire to form a coating about 10 mils thick. The wire coating was carried out with a one-inch Killion extruder operating at a screw speed of about 15 r.p.m. and with a heated barrel to give a melt temperature of about 315° C. A spider-type drawdown die with .188 inch OD and .101 inch ID was used. The wire was drawn through the die at about 100 ft./min. Immediately after coating the wire with the melt, it was passed through a water quench bath.

A sample of the coated wire was twisted around itself several times and then placed in a 200° C. air oven. The wire insulation cracked in several places after exposure to the air oven overnight.

Several lengths of the coated wire were exposed to the electron beam of the resonant transformer. The samples were exposed under the conditions described in Example 1 for 100 seconds. The total dose of radiation was about 15 megarads. Samples of the irradiated wire were twisted on themselves and placed in the air oven at 200° C. The irradiated samples did not crack after exposure to the oven overnight but rather survived over 3000 hours under these conditions without cracking.

EXAMPLE 4

In contrast to the two-component polymers of the foregoing examples and to illustrate the effect of irradiation on terpolymers in which the third monomer was a vinyl monomer having a side chain of at least two carbons, a tetrafluoroethylene/ethylene/perfluoropropyl perfluorovinyl ether terpolymer was prepared which contained about 52 mole percent TFE, 46.5 mole percent ethylene and the remainder vinyl ether, and had a melt viscosity at 300° C. of $3.2 \times 10^4$ poises and melting point of 254° C. was pressed into 4-inch x 4-inch films of 7-8 mil thickness by the conditions of Example 2. The films were irradiated by the same procedure cited in Example 1 for exposure of 50 to 500 seconds. This corresponded to doses in the range of 7.8 to 78 megarads.

A pencil-type, constant temperature solder iron rated at 25 watts was heated up for 15 minutes. Samples of nonirradiated and irradiated terpolymer films were placed on a piece of aluminum foil. The solder iron was pressed down on each sample of film. The nonirradiated sample readily flowed out and away from the solder iron. The irradiated samples were dented and deformed by the solder iron but did not flow away from it.

Films of the copolymer of this example exhibited the following tensile properties at 200° C.

| Radiation dosage (megarads) | Tensile strength (p.s.i.) | Ultimate elongation, percent |
|---|---|---|
| 0 | 534 | 460 |
| 7.8 | 535 | 520 |
| 15.6 | 672 | 490 |
| 39 | 468 | 120 |
| 78 | 482 | 81 |

This example shows that even without irradiation, the terpolymer has good tensile properties at high temperature, but that the improvement in solder-iron resistance is still obtained with the irradiation.

EXAMPLE 5

Several 4-inch x 4-inch films, 8 to 10 mils in thickness, were prepared from the same copolymer and under the same conditions as described in Example 2. Two films each were exposed for 25, 50 and 100 seconds, respectively, in the resonant transformer as in Example 1. One set of exposed films was stored in air as was done in the other examples. The other set of films was stored under an $N_2$ atmosphere in a glass tube. The glass tube containing the films was placed in a 200° C. oven for 15 minutes. At the end of this time, the films were removed from the tube and the tensile properties were compared to those of the untreated films. The test results are shown in the following table:

| | Tensile data, 200° C. | | | |
|---|---|---|---|---|
| | No post-treatment | | Treated at 200° C. in $N_2$ | |
| Exposure (megarads) | Tensile strength (p.s.i.) | Ult. elong., percent | Tensile strength (p.s.i.) | Ult. elong., percent |
| 0 | 511 | 7.7 | | |
| 3.9 | 552 | 7.3 | 610 | 13 |
| 7.8 | 583 | 9.0 | 691 | 120 |
| 15.5 | 639 | 240 | 1,010 | 450 |

The tensile properties of the post-treated samples were improved over the irradiated, but not post-treated samples.

EXAMPLE 6

The solder-iron resistance of insulated wires was determined by measuring the time it takes the solder iron, supported at a 45° angle to the wire, to make electrical contact to the wire. The tip-temperature of the solder iron was controlled at either 357° C. or 419° C. for these tests. Weights were attached to the tip to put pressure on the wire. These weights ranged from ½ to 1 pound (tip weighed ½ lb.).

A copolymer of ethylene and tetrafluoroethylene which contained 53 mole percent of TFE and which had a melt viscosity of $4.3 \times 10^4$ poises at 300° C. was melt extruded onto a 19-strand AWG 20 tin plated copper wire to a thickness of 9.8 mils. The coated wire was then irradiated at doses ranging from about 3 to 12 megarads. The wire was then heated at 160° C. for about 45 seconds under $N_2$ after the irradiation.

The table shows the effect of the irradiation on the solder-iron resistance.

| Exposure (megarads) | Solder-iron temperature (° C.) | Weight of tip (lbs.) | Time to failure |
|---|---|---|---|
| 0 | 357 | ½ | Less than 10 sec. |
| 3 | 357 | ½ | 0.8 min. |
| 6 | 357 | ½ | Greater than 10 min. |
| 6 | 419 | ¾ | 1.6 min. |
| 12 | 419 | 1 | Greater than 10 min. |

EXAMPLE 7

A chlorotrifluoroethylene/ethylene copolymer which contained 49 mole percent chlorotrifluoroethylene and had a melting point (DTA peak) of 235° C. was extruded onto a 7-strand, AWG 22 silver-coated copper wire to form a coating about 0.025 cm. thick. Short lengths of this coated wire were placed on the water-cooled table below the window of the electron beam unit. The insulated wire samples were enclosed in a small box covered by thin aluminum foil and kept under a purge of nitrogen gas.

The electron source was a General Electric 2000-kvp resonant transformer operating at 0.5 ma. beam current. The dose rate from this source at 30 cm. distance was 0.078 magarad per second for the 0.025 cm. wire insulation.

The samples were given exposure of 38, 115, 154, 192, 320 and 640 seconds under the beam at room temperature. These exposures corresponded to radiation dosages of 3, 9, 12, 15, 25, and 50 Mrads, respectively. The samples were heat treated for 20 minutes at 160° C. under a nitrogen atmosphere.

The solder iron resistance of the irradiated, insulated wires was determined by measuring the time it takes the solder iron, supported at a 45° angle to the wire, to make electrical contact to the wire. The tip temperature of the solder iron was controlled at 400° C. for these tests and the weight of the tip was 227 g.

The table shows the effect of the irradiation on the solder-iron resistance. (An equivalent wire coated with polytetrafluoroethylene would have a solder-iron resistance of greater than 10 mins. under the conditions of this test.)

| Exposure (megarads) | Solder-iron temperature (° C.) | Time to failure |
|---|---|---|
| 3 | 400 | Less than 3 sec. |
| 9 | 400 | Do. |
| 12 | 400 | 13.8 sec. |
| 15 | 400 | 13.2 sec. |
| 25 | 400 | Greater than 10 min. |
| 50 | 400 | Do. |

EXAMPLE 8

Extruded film (0.015–0.018 cm. in thickness) of the same copolymer described in Example 7 was irradiated under the conditions described in Example 7. The film was irradiated for exposures of 159 and 327 seconds. These exposures corresponded to radiation doses of 12 and 25 Mrads, respectively. The ultimate elongations were determined at 200° C. and are shown in the following table:

| | Tensile properties at 200° C. | |
|---|---|---|
| Exposure (megarads) | Ultimate strength, kg./cm.² | Ultimate elongation, percent |
| 0 | 21 | 123 |
| 25 | 11.7 | 580 |

The ultimate elongation at 200° C. was considerably improved by irradiation of 25 Mrads. The more than 4-fold increase in ultimate elongation more than counterbalances the decrease in ultimate strength in terms of value in use, especially as a wire coating.

EXAMPLE 9

A sample of the copolymer powder described in Example 7 was allowed to soak in a 1% solution of triallyl cyanurate in "Freon" 113 for 16 hours. The polymer slurry was placed in an air circulating oven at 125° C. for one hour. The dried mixture was compression molded at 250° C. An untreated sample of polymer was also compression molded under the same conditions.

The 0.013 cm. films which were obtained were irradiated as described in Example 7. The film samples were given exposures of 79 and 159 seconds. These exposures corresponded to radiation dosages of 6 and 12 Mrads, respectively. The samples were heat treated for 20 mins.

at 160° C. The tensile properties of the films were determined at 200° C. and are shown below:

| Sample | Exposure (megatrads) | Tensile properties at 200° C. | |
|---|---|---|---|
| | | Ultimate strength, kg./cm.² | Ultimate elongation, percent |
| E/CTFE | 0 | 16.5 | 33 |
| E/CTFE + TAC | 6 | 9.1 | 84 |
| E/CTFE + TAC | 12 | 8.8 | 150 |

NOTE.—E/CTFE = ethylene/chlorotrifluoroethylene copolymer TAC = triallyl cyanurate.

The addition of triallyl cyanurate improves the efficiency of irradiation as evidenced by improved ultimate elongation a low radiation dosage.

EXAMPLE 10

The copolymer used in this example was the same as the poly(tetrafluoroethylene/ethylene) used in Example 1 except that the copolymer was composed of about 52 mole percent tetrafluoroethylene and the remainder ethylene, and the copolymer had a melt viscosity of $4.9 \times 10^4$ poises. Film samples were prepared following the procedure of Example 2 and these samples were exposed to radiation using the resonant transformer described in Example 1 to obtain the results described in the following table.

| Exposure (megarads) | Irradiation temperature (° C.) | Tensile properties at 200° C. | | |
|---|---|---|---|---|
| | | Yield strength (p.s.i.) | Ultimate strength (p.s.i.) | Ultimate elongation, percent |
| 0 | | 347 | 347 | 12 |
| 7 | Room temperature [1] [2] | 541 | 840 | 545 |
| 7 | 150–198 [3] | 541 | 813 | 421 |
| 7 | 175–660 [3] | 486 | 816 | 392 |
| 10 | 220–245 [3] | 471 | 701 | 340 |

[1] These samples were irradiated on a water cooled plate which maintained the sample temperature at room temperature.
[2] After irradiation, the samples were heat-treated at 162° C. in a nitrogen atmosphere for 20 minutes.
[3] These samples were irradiated on a hot plate which heated the samples to the lowest temperature of the range; subsequent irradiation caused the temperature to rise, and the highest temperature of the range was the temperature at the time irradiation was stopped.

These results show improved high temperature mechanical properties at both low and high temperatures of irradiation. The best results, however, occurred using room temperature irradiation followed by heat treatment.

The high temperatures of irradiation were above the glass transition temperature of the copolymer which had a glass transition temperature of about 110° C. The glass transition temperature of the copolymer was measured by increasing the temperature of the copolymer and at the same time measuring its internal friction by means of a torsion pendulum operating at a frequency of one cycle per second. The glass transition temperature is taken as the highest temperature of any transition below the melting point which can also be called the alpha-relaxation temperature. Further description of glass transition temperature and procedure for determining same is disclosed in N. G. McCrum, B. E. Reed, and G. Williams, "Analastic and Dielectric Effects in Polymeric Solids," Wiley and Sons, New York (1957) pages 192–195.

EXAMPLE 11

The copolymer tested in this example was poly(ethylene/chlorotrifluoroethylene) containing 52.3 mole percent chlorotrifluoroethylene and having a melting point of 245° C., a glass transition temperature of about 140° C., and a melt viscosity of $2.5 \times 10^4$ poises at 300° C. The test samples were made of extruded film 14 mils thick of the copolymer. The film was irradiated, using a resonant transformer, in a nitrogen atmosphere with a 2 mev. electron beam at 0.5 ma. current for 312 seconds, which corresponded to a radiation dosage of 25 mrads. The following results were obtained:

| Exposure (megarads) | Irradiation temperature (° C.) | Tensile properties at 200° C. | |
|---|---|---|---|
| | | Ultimate strength (p.s.i.) | Ultimate elongation, percent |
| 0 | | 330 | 54 |
| 25 | 125–155 | 331 | 206 |
| 25 | Room temperature [1] | 212 | 539 |

[1] Irradiation was followed by heat treatment at 160° C. for 20 minutes.

The melting points given in this specification are determined by differential thermal analysis using a heating rate of 15° C. per minute and the minimum point (DTA peak) on the curve as the melting point.

The values for ultimate elongation disclosed herein are determined as follows:

Four bars are cut from film 10 mils thick (unless otherwise specified) of the polymer being tested with microtensile die as described in ASTM D 1708. The films are prepared by compression molding at 310° C. for the tetrafluoroethylene-containing polymer and 260° C. for the chlorotrifluoroethylene-containing polymer, followed by quenching in ice water. The tensile test machine conforms to specifications in ASTM D 638 and is fitted with an insulated test chamber which is maintained at 200 ±1° C. with heated air. The ultimate elongation is determined by the procedure described in ASTM D 638, except that the test specimens are obtained from the film described above. The initial jaw separation of the test machine is 22.2±1.03 mm. and the crosshead speed is 5.1 cm. per minute. Elongation at break (ultimate elongation) is determined from the recording chart by dropping a perpendicular line from the break point of the curve on the chart. The distance in cm. from the perpendicular line from the beginning of the load time curve is read from the chart, and this distance times 18.1 is the ultimate elongation in percent.

The melt viscosities disclosed herein unless otherwise specified are determined in the same manner as disclosed in U.S. Patent 2,946,763 except that the conversion factor is 32,000 instead of 53,150 and for the tetrafluoroethylene-containing copolymer (and terpolymer), the melt temperature is 300° C. and for the chlorotrifluoroethylene-containing copolymer (including terpolymer) the melt temperature is 260° C.

"Freon" 113 is 1,1,2-trichloro-1,2,2-trifluoroethane.

As many apparently widely different embodiments of this invention may be made without departing from the spirit and scope thereof, it is to be understood that this invention is not limited to the specific embodiments thereof except as defined in the appended claims.

What is claimed is:

1. A process for improving the high temperature tensile properties of poly(ethylene/tetrafluoroethylene) comprising subjecting the copolymer to an effective amount of ionizing radiation, the ethylene content of said copolymer being from 40 to 60 mole percent and the tetrafluoroethylene content of said copolymer being from 40 to 60 mole percent, based on the ethylene plus tetrafluoroethylene content of the copolymer.

2. The process of claim 1 and additionally heat-treating the copolymer, following the subjecting step.

3. The process of claim 1 wherein the subjecting step is carried out at a temperature less than 60° C.

4. The process of claim 1 wherein the content of ethylene and tetrafluoroethylene is from 45 to 55 mole percent for each.

5. The process of claim 1 wherein said radiation is at a dosage of from 2 to 80 megarads and at a temperature below the glass transition temperature of said copolymer.

6. The irradiated copolymer of claim 1.

7. A process for improving the high temperature tensile properties of a copolymer selected from the group consisting of poly(ethylene/tetrafluoroethylene) or poly(ethylene/chlorotrifluoroethylene), comprising subjecting the copolymer to an effective amount of ionizing radiation, the ethylene content of said copolymer being from 40 to 60 mole percent and the tetrafluoroethylene or chlorotrifluoroethylene content of said copolymer being from 40 to 60 mole percent, based on the ethylene plus tetrafluoroethylene or chlorotrifluoroethylene content of the copolymer.

8. The process of claim 7 wherein said copolymer is poly(ethylene/chlorotrifluoroethylene).

9. The process of claim 8 wherein the content of ethylene and chlorotrifluoroethylene is from 45 to 55 mole percent for each.

10. The process of claim 8 and additionally heat treating the copolymer, following the subjecting step.

11. The irradiated copolymer of claim 8.

12. A process for increasing the ultimate elongation at 200° C. of a copolymer selected from the group consisting of poly(ethylene/tetrafluoroethylene) and poly(ethylene/chlorotrifluoroethylene), comprising subjecting the copolymer to an ultimate elongation increasing amount of ionizing radiation, the ethylene content of said copolymer being from 40 to 60 mole percent and the tetrafluoroethylene or chlorotrifluoroethylene content of said copolymer being from 40 to 60 mole percent, based on the ethylene plus tetrafluoroethylene or chlorotrifluoroethylene content of the copolymer.

13. The process of claim 12 wherein each said copolymer has a melting point of at least 220° C.

References Cited
UNITED STATES PATENTS

| | | | |
|---|---|---|---|
| 3,556,965 | 1/1971 | D'Agostino et al. | 204—159.2 |
| 2,559,752 | 7/1951 | Berry | 260—87.5 |
| 3,116,226 | 12/1963 | Bowers | 204—159.2 |
| 2,961,389 | 11/1960 | Hines et al. | 204—159.2 |

PAUL LIEBERMAN, Primary Examiner

W. J. BRIGGS, SR., Assistant Examiner

U.S. Cl. X.R.

117—232; 260—63 HA, 80.76, 80.77, 80.78 87.5 B